(12) United States Patent
Voigt et al.

(10) Patent No.: US 12,339,146 B2
(45) Date of Patent: Jun. 24, 2025

(54) MEASURING TUBE, RECEIVING UNIT, AND MAGNETIC-INDUCTIVE FLOW METER

(71) Applicant: Endress+Hauser Flowtec AG, Reinach (CH)

(72) Inventors: Frank Voigt, Weil am Rhein (DE); Steffen Ziegler, Schopfheim (DE)

(73) Assignee: Endress+Hauser Flowtec AG, Reinach (CH)

( * ) Notice: Subject to any disclaimer, the term of this patent is extended or adjusted under 35 U.S.C. 154(b) by 402 days.

(21) Appl. No.: 17/757,438

(22) PCT Filed: Dec. 1, 2020

(86) PCT No.: PCT/EP2020/084078
§ 371 (c)(1),
(2) Date: Jun. 15, 2022

(87) PCT Pub. No.: WO2021/121957
PCT Pub. Date: Jun. 24, 2021

(65) Prior Publication Data
US 2023/0013776 A1 Jan. 19, 2023

(30) Foreign Application Priority Data

Dec. 18, 2019 (DE) .......................... 102019135011.5

(51) Int. Cl.
*G01F 1/58* (2006.01)
*G01F 15/14* (2006.01)
*G01F 15/18* (2006.01)

(52) U.S. Cl.
CPC .............. *G01F 1/584* (2013.01); *G01F 1/586* (2013.01); *G01F 15/14* (2013.01); *G01F 15/18* (2013.01); *G01F 1/58* (2013.01)

(58) Field of Classification Search
CPC .......... G01F 1/584; G01F 1/586; G01F 15/14; G01F 15/18; G01F 1/58
See application file for complete search history.

(56) References Cited

U.S. PATENT DOCUMENTS 4,679,442 A 7/1987 Kubota
4,881,413 A 11/1989 Georgi et al.
(Continued)

FOREIGN PATENT DOCUMENTS

CN 104395700 A 3/2015
CN 105784023 A 7/2016
(Continued)

*Primary Examiner* — Peter J Macchiarolo
*Assistant Examiner* — John M Royston
(74) *Attorney, Agent, or Firm* — Christopher R. Powers; Endress+Hauser (USA) Holding, Inc.

(57) ABSTRACT

The present disclosure relates to a measuring tube for conducting a flowable medium in a longitudinal direction, which includes: a measuring tube body designed to be electrically insulating, the measuring tube body including an integrally designed holder and a mounting surface for installing the measuring tube in a receiving unit in a mechanically detachable manner in a position defined by the mounting surface; at least two measuring electrodes positioned diametrically in the measuring tube body to form a galvanic contact with the medium; and at least one pole shoe formed from a single sheet metal part or from a plurality of sheet metal parts stacked in particular in the longitudinal direction of the pole shoe and connected to one another, the pole shoe being located in the holder. The present disclosure also relates to a receiving unit and a magnetic-inductive flow meter.

10 Claims, 6 Drawing Sheets

(56) References Cited

U.S. PATENT DOCUMENTS

| | | | |
|---|---|---|---|
| 5,583,299 A | 12/1996 | Murase | |
| 6,260,420 B1 | 7/2001 | Ketelsen | |
| 2006/0216829 A1* | 9/2006 | Bouboulis | G01N 33/491 436/70 |
| 2010/0313675 A1 | 12/2010 | Goegge et al. | |
| 2022/0214202 A1* | 7/2022 | Laursen | G01F 15/14 |

FOREIGN PATENT DOCUMENTS

| | | |
|---|---|---|
| DE | 102016118064 A | 9/2016 |
| DE | 102016118064 A1 | 3/2018 |
| EP | 852704 A2 | 7/1998 |

* cited by examiner

MEASURING TUBE, RECEIVING UNIT, AND MAGNETIC-INDUCTIVE FLOW METER

CROSS-REFERENCE TO RELATED APPLICATIONS

The present application is related to and claims the priority benefit of German Patent Application No. 102019135011.5, filed on Dec. 18, 2019, and International Patent Application No. PCT/EP2020/084078, filed Dec. 1, 2020, the entire contents of which are incorporated herein by reference.

TECHNICAL FIELD

The invention relates to a measuring tube, a receiving unit and a magnetic-inductive flow meter.

BACKGROUND

Magnetic-inductive flow meters are used for determining the flow rate and the volumetric flow of a flowing medium in a process line. A magnetic-inductive flowmeter has a magnet system that generates a magnetic field perpendicular to the direction of flow of the flowing medium. Single coils are typically used for this purpose. In order to realize a predominantly homogeneous magnetic field, pole shoes are additionally formed and attached such that the magnetic field lines run over the entire pipe cross section substantially perpendicularly to the transverse axis or in parallel to the vertical axis of the measuring pipe. A measuring electrode pair attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since, according to Faraday's law of induction, the tapped measurement voltage depends on the velocity of the flowing medium, the flow rate u and, with the aid of a known pipe cross section, the volumetric flow $\dot{V}$ can be determined from the induced measurement voltage U.

Until now, there have only been a few flow meters that make use of Faraday's law of magnetic induction and are simultaneously suitable for so-called disposable applications. Disposable applications require that the media-contacting parts can be replaced. In magnetic-inductive flow meters, they would accordingly be the measuring electrodes and parts of the measuring tube, such as the liner or the entire measuring tube body.

DE 10 2016 118 064 A1 teaches a magnetic-inductive flow meter which has a U-shaped measuring tube holder for exchangeable measuring tubes. The magnet system is located in the measuring device housing, and the mating contacts for the measuring electrodes mounted in the measuring tube are located in the measuring tube holder.

A disadvantage of the already known magnetic-inductive flow meter for disposable applications is that a homogeneity of the magnetic field in the measuring section of the measuring tube can only be realized by an increased energy consumption.

SUMMARY

The object of the invention is to provide a magnetic-inductive flow meter for disposable applications which requires less energy for a substantially homogeneous magnetic field in the measuring section of the measuring tube.

The object is achieved by a measuring tube, a receiving unit, and a magnetic-inductive flow meter according to the present disclosure.

The measuring tube according to the invention for conducting a flowable medium in a longitudinal direction comprises:
  a measuring tube body designed especially to be electrically insulating,
    wherein the measuring tube body has an integrally formed holder,
    wherein the measuring tube body has a mounting surface for the mechanically detachable installation of the measuring tube in a receiving unit in a position that is defined especially by the mounting surface;
  at least two measuring electrodes, especially arranged diametrically in the measuring tube body, for forming a galvanic contact with the medium; and
  at least one pole shoe which is formed from a single sheet metal part or from a plurality of sheet metal parts stacked especially in the longitudinal direction of the pole shoe and connected to one another,
    wherein the pole shoe is located in the holder.

Pole shoes with mounted coils are generally installed in magnetic-inductive flow meters, wherein the pole shoes are attached to an lateral surface of the measuring tube. They surround the measuring tube and span a region in which the magnetic field in the medium runs approximately homogeneous or perpendicular to the abscissa axis. Magnetic-inductive flow meters for disposable applications have a receiving unit in which the measuring circuit, the operating circuit and the magnetic-field-generating device are arranged. If a pole shoe is provided, it is arranged in the housing of the receiving unit. The replaceable measuring tubes generally do not have any components of the magnetic-field-generating device. According to the invention, the measuring tube body of the measuring tube has a holder in which a pole shoe is located. In this case, the pole shoe is also replaced with each measuring tube to be replaced. As a result, the distance between the channel of the measuring tube, which can be supplied with the medium, and the magnetic-field-generating device is reduced, and the magnetic field running through the channel of the measuring tube is more homogeneous.

It is advantageous if the measuring tube body has two oppositely arranged holders, each having a pole shoe arranged in the holder.

One embodiment provides for the pole shoe to have a first end face and a second end face that delimit the pole shoe in the longitudinal direction,
  wherein the measuring tube body extends along the first end face and second end face and in each case covers them, especially completely, in the longitudinal direction.

An advantage of the embodiment is that the pole shoe is fixed by the coverage against movements in the longitudinal direction of the measuring tube.

One embodiment provides that the pole shoe has a first side face and a second side face,
  wherein the first side face connects the first end face to the second end face,
  wherein the second side face connects the first end face to the second end face,
  wherein the measuring tube body extends along the first side face and the second side face and especially covers them completely.

An advantage of the embodiment is that the pole shoe is additionally also fixed against movements in the transverse direction of the measuring tube. It is advantageous if the holder is designed in such a way that the pole shoe is connected to the measuring tube body in a positive-locking manner.

One embodiment provides that a base surface of the pole shoe is not covered, or is only partially covered, by the measuring tube body,
wherein the base surface connects the first end face and the second end face,
wherein the base surface connects the first side face to the second side face.

The open base surface serves to be brought into contact with a coil core which is part of a magnetic-field-generating device arranged in the receiving unit. Care must be taken here that no inclusions arise between the base surface and the coil core. Therefore, the base surface is complementary to the end section of the coil core. According to an advantageous embodiment, the base surface is planar. The pole shoe serves to guide the magnetic field generated by the coil and guided by the coil core up to the channel and to span it there over the measuring section, in which the measuring electrodes are also arranged.

One embodiment provides that the measuring tube body is monolithic,
wherein the measuring tube body is formed by means of a primary shaping method, especially by means of an injection molding method,
wherein the pole shoe is partially overmolded by means of the primary shaping method, especially by means of the injection molding method, in part by a potting material forming the measuring tube body.

An advantage of the embodiment is the simple and cost-effective production of a measuring tube body with integrated measuring electrodes and an integrated pole shoe. Thus, the pole shoes do not have to be inserted subsequently into the guide.

One embodiment provides that a longitudinal plane, in which runs a longitudinal axis of the measuring tube and which runs perpendicular to an electrode axis connecting two measuring electrodes, divides the measuring tube body into two sides,
wherein the measuring tube comprises exactly one field guide body for guiding a magnetic field which is arranged on one of the two sides of the measuring tube body,
wherein the field guide body is connected in a positive-locking manner to the measuring tube body,
wherein the field guide body has at least one and preferably two open contact surfaces,
wherein the field guide body is configured to connect two coil cores of the magnetic-field-generating device to one another after the arrangement of the measuring tube in a receiving unit.

The advantage of the embodiment is that a closed magnet system can be realized without any disadvantages for the installation-friendliness of the measuring tube in the measuring tube holder. The magnetic-field-generating device is modular. This means that a part of the magnetic-field-generating device is arranged on the measuring tube. In the present case, these are the pole shoe or pole shoes and a field guide body. In the mounted state, the magnet system is partially open. The magnet system is closed only when the measuring tube is inserted into the measuring tube holder and the field guide body of the measuring tube is in contact with the magnetic-field-generating device.

A receiving unit according to the invention for receiving a replaceable measuring tube, especially the measuring tube according to the invention, comprises:
a housing,
wherein the housing has a measuring tube holder;
a magnetic-field-generating device for generating a magnetic field that extends through the measuring tube holder,
wherein the magnetic-field-generating device comprises a coil and a coil core,
wherein the magnetic-field-generating device is arranged in the housing;
a measuring circuit for determining a measuring voltage applied across measuring electrodes of the measuring tube;
an operating circuit for operating the magnetic-field-generating device;
at least two terminal contacts which are designed to detachably connect the measuring electrodes of the measuring tube electrically and mechanically to the measuring circuit,
wherein contact regions of the respective terminal contacts protrude from the housing and extend into the measuring tube holder.

One embodiment provides that the coil core extends through an opening in the measuring tube holder,
wherein the coil core is designed and arranged in the measuring tube arrangement in such a way that, when the measuring tube is arranged in the measuring tube holder, a contact is produced between the coil core and pole shoe.

An advantage of the embodiment is that no insulating separation exists between the coil core and the pole shoe which would reduce the magnetic field extending through the channel of the measuring tube.

One embodiment provides that the measuring tube arrangement is delimited by two leg surfaces perpendicular to a mounting direction and to the longitudinal direction of the measuring tube body,
wherein the measuring tube arrangement is delimited by a base surface in the mounting direction.

One embodiment provides that a coil is arranged behind the base surface in the mounting direction,
wherein the coil core has a first coil core section which extends through the coil,
wherein the coil core has a second coil core section which, starting from the first coil core section, extends in the direction of one of the two leg surfaces.

Such an embodiment has a simplified construction and can be easily mounted in the receiving unit. The coil core is preferably formed by a sheet metal part or by a plurality of stacked sheet metal parts.

One embodiment provides that the magnetic-field-generating device has two coils, each with a coil core extending through the interior of a coil,
wherein a connection of the two coil cores is realized via exactly one field guide body,
wherein the magnetic-field-generating device has two contact surfaces, each of which serves as a contact surface for a field guide body arranged on the measuring tube,
wherein the contact surfaces are arranged on an end face of the housing.

Such an embodiment has the advantage that field guidance around both sides of the measuring section along the measuring electrodes can be realized. According to the invention, the partially open magnet system is closed by a field guide body arranged in the measuring tube.

A magnetic-inductive flowmeter according to the invention comprises:
- a receiving unit, especially the receiving unit according to the invention,
- a measuring tube for conducting a flowable medium in the flow direction, especially the measuring tube according to the invention,
  - wherein the measuring tube is connected in a mechanically detachable manner, especially a friction-locking and/or positive-locking manner, to the receiving unit.

One embodiment provides that a pole shoe arranged on the measuring tube and a coil core extending through an opening in the measuring tube holder touch one another.

This results in an optimal transmission of the magnetic field from the coil core to the pole shoe.

One embodiment provides that a magnetic-field-generating device arranged in a housing of the receiving unit has two coils,
- wherein the two coils each have at least one coil core which extends through the respective coil,
- wherein a field guide body of the measuring tube connects the two coil cores to one another.

Thus, the partially open magnet system of the magnetic-field-generating device is closed in the receiving unit by inserting the measuring tube and contacting with the field guide body arranged in the measuring tube.

BRIEF DESCRIPTION OF THE DRAWINGS

The invention is explained in greater detail with reference to the following figures. The following are shown.

DETAILED DESCRIPTION

Figure 1:
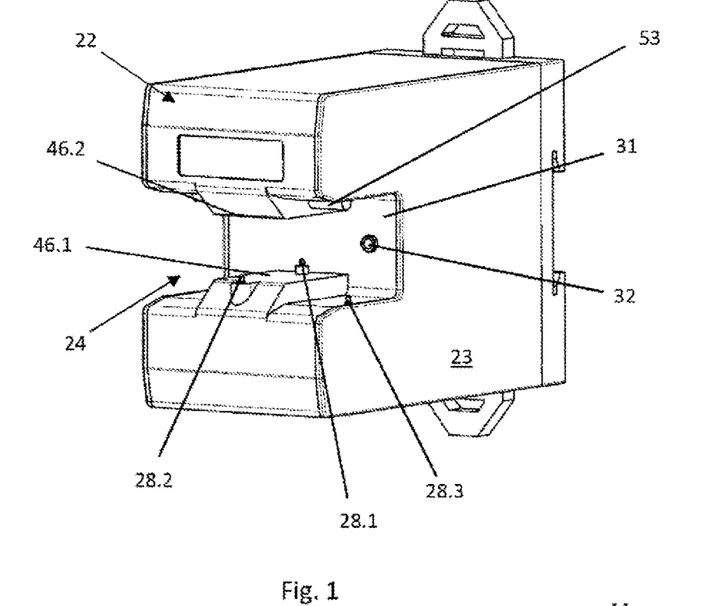
FIG. 1 shows a perspective view of an embodiment of the receiving unit according to the present disclosure.

FIG. 1 shows a perspective view of an embodiment of the receiving unit 22. The receiving unit 22 comprises a housing 23 which has a measuring tube holder 24. The measuring tube holder 24 serves to receive and guide a measuring tube. With the present receiving unit 22, the measuring tube must be inserted in a straight line in the mounting direction. The measuring tube holder 24 is delimited by a base surface 31 in the mounting direction. The base surface 31 is part of the housing wall. In addition, the measuring tube holder 24 is delimited by two leg surfaces 46.1, 46.2 in a direction perpendicular to the mounting direction and perpendicular to the longitudinal direction of the measuring tube 1. The leg surface 46.1, 46.2 can extend over a plurality of planes. Two openings are made in the leg surface 46.2 through which a fixing body 53 extends. The fixing body 53 is part of a fixing device and has a resilient design. This means that, when the measuring tube is inserted into the measuring tube holder 24, a force perpendicular to the mounting direction displaces the fixing body in the direction of the housing interior. If the measuring tube is in the installed position, the spring presses the fixing body into a holder provided in the measuring tube body.

Terminal contacts 28.1, 28.2, 28.3 which have contact regions 29 that project into the measuring tube holder 24 are arranged in the leg surface 46.1. The terminal contacts 28.1, 28.2, 28.3 have a resilient design and are connected to a measuring circuit. When the measuring tube is inserted, the terminal contacts 28.1, 28.2, 28.3 are displaced in the direction of the housing interior. The resilient design ensures that, in the final installed state of the measuring tube, the terminal contacts 28.1, 28.2, 28.3 are moved in the direction of the initial position and thus form a mechanical contact with the assigned measuring electrode or reference electrode of the measuring tube. The connection between the terminal contacts 28.1, 28.2, 28.3 and the respective measuring electrodes or the reference electrode is positive locking and/or friction locking.

A plug connector 32 is arranged in the base surface 31 and serves to connect a temperature sensor arranged in the measuring tube to the measuring circuit arranged especially in the housing. The plug connector 32 is designed complementary to the contact connection of the temperature sensor. In an advantageous embodiment, the contact connection of the temperature sensor is designed as a jack plug, and the plug connector 32 is designed as a jack socket.

Figure 2:
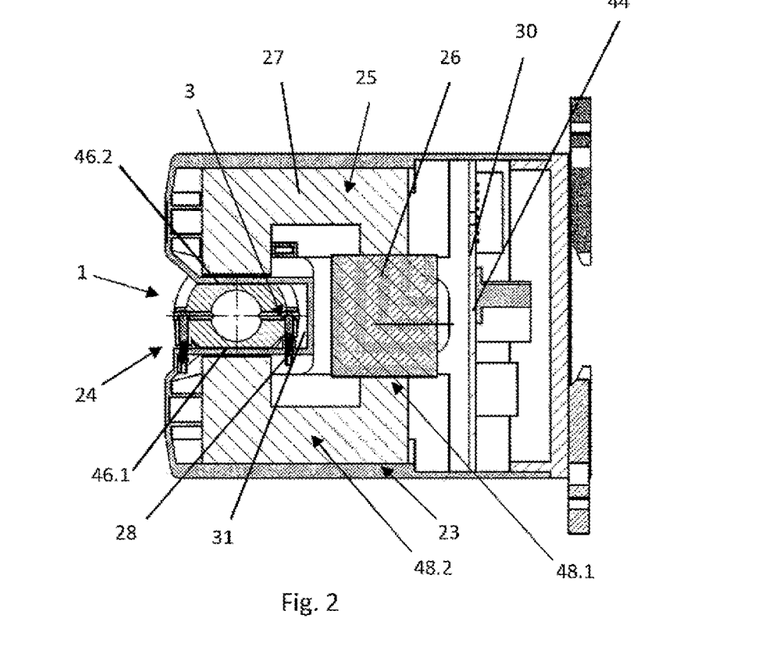
FIG. 2 shows a longitudinal section through the embodiment of the receiving unit depicted in FIG. 1.

FIG. 2 shows a longitudinal section through an embodiment of the receiving unit 22. The measuring circuit 30 and operating circuit 44 are arranged in the housing 23 of the receiving unit 22. The measuring circuit 30 is configured to measure a measurement voltage across the measuring electrodes of the measuring tube. For this purpose, it is connected to terminal contacts 28 which, when the measuring tube 1 is inserted, form an electrical contact with the measuring electrodes 3. The operating circuit 44 is configured to apply a coil signal to the coil 26. In addition, the magnetic-field-generating device 25 is arranged in the interior of the housing 23. The magnetic-field-generating device 25 comprises a coil core 27 and a coil 26, wherein the coil core 27 extends through a coil cross section. The coil 26 is arranged behind the base surface 31 in the mounting direction. The coil core 27 has a first partial section which extends through the coil 26, and two partial sections which extend, starting from the first partial section, in the direction of the leg surfaces 46.1, 46.2. In the longitudinal section of the coil core, the coil core 27 assumes the shape of a C or a horseshoe. The magnetic-field-generating device 25 has the shape of a magnetic-field-generating device 25 usually used in a split pole motor. The coil core 27 is preferably designed in one piece. The coil core 27 can be formed from a solid magnetically conductive material, from a single sheet metal part, or from a plurality of sheet metal parts stacked especially in the transverse direction of the pole shoe and connected to one another. The coil core 27 has a first coil core section 48.1 which extends through the coil 26, and a second coil core section 48.2 which extends from the first coil core section 48.1 in the direction of one of the two, especially parallel, leg surfaces 46.1, 46.2.

In the measuring tube holder 24, a measuring tube 1 is arranged in a mechanically detachable and especially positive-locking and/or friction-locking manner. In the depicted embodiment, the coil core 27 is separated from the measuring tube 1 at least by the wall of the housing 23.

Figure 3:
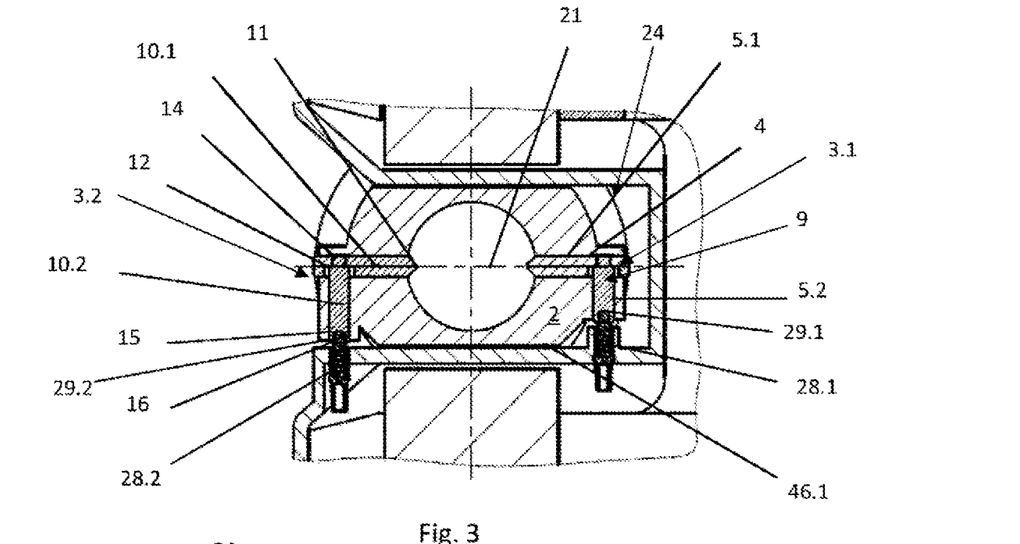
FIG. 3 shows a detail view from the longitudinal section of FIG. 2 of the terminal contacts.

FIG. 3 shows a close-up view of the longitudinal section of FIG. 2. The terminal contacts 28.1, 28.2 are arranged in the leg surface 46.1 and are in contact with the measuring electrodes 3.1, 3.2 via the contact regions 29.1, 29.2. The measuring electrodes 3.1, 3.2 each have a measuring electrode body 9 which has a first measuring electrode part 10.1 arranged in a first region 5.1 of the holder, and a second measuring electrode part 10.2 arranged in a second region 5.2, wherein the direction of the longitudinal axes 6.1, 6.2 of the two measuring electrode parts 10.1, 10.2 differs. In the depicted embodiment, the measuring electrodes 3.1, 3.2 are each designed in two parts and are arranged in a holder in the measuring electrode body. At least the first measuring electrode part 10.1 of the measuring electrodes 3.1, 3.2 has been at least partially overmolded in an injection molding method. The second measuring electrode part 10.2 has been inserted into the provided second region 5.2 of the holder after the injection molding process. The front region 11 of a first measuring electrode part 10.1 extends in the channel of the measuring tube body 2 that is suitable for conducting the medium. In addition, the first measuring electrode part 10.1 has a holder 13 in the end region 12 which is complementary to a front region 14 of the second measuring electrode part 10.2. The front region 14 of the second measuring electrode part 10 is arranged in the holder 13 of the first measuring electrode part 10.1. The second measuring electrode part 10.2 has an end region 15 with a holder 16 which serves to receive a partial section of a terminal contact 28. The longitudinal axis of the first measuring electrode part 10.1 corresponds to the electrode axis 21. The longitudinal axis of the second measuring electrode part 10.2 is oriented inclined to the longitudinal axis of the first measuring electrode part 10.1. In the depicted embodiment, the longitudinal axis of the first measuring electrode part 10.1 and the longitudinal axis of the second measuring electrode part 10.2 form an angle of approximately 90°. The first measuring electrode part 10.1 and the second measuring electrode part 10.2 each have a cylindrical basic shape. The holder 14 of the first measuring electrode part 10.1 also has a cylindrical basic shape. The holder 16 of the second measuring electrode part 10.2 is designed as a convex depression and thus enables easier insertion of the terminal contact 28.1, 28.2. The second measuring electrode part 10.2 of the first measuring electrode 3.1 is shorter than the second measuring electrode part 10.2 of the second measuring electrode 3.2. This is related to the arrangement of the terminal contacts 28.1, 28.2 in the housing 23. The terminal contacts 28.2 are arranged in the input of the measuring tube holder 24, while the terminal contacts 28.1 are located closer to the base surface of the measuring tube holder 24. The contact region 29.1 of the first terminal contact 28.1, which is arranged in the mounting direction downstream of the second terminal contact 28.2, is arranged offset in a direction perpendicular to the mounting direction and perpendicular to the longitudinal direction of the measuring tube body, or in the direction perpendicular to the longitudinal plane of the measuring tube body 2 extending through the electrode axis 21. This means that the contact region 29.1 projects further into the measuring tube holder 24 than the contact region 29.2 of the second terminal contact 28.2. This allows simple and safe insertion of the measuring tube 1 into the measuring tube holder 24. The terminal contacts 28 have a resilient design. When the measuring tube 1 is inserted, a section of the measuring tube body 2 displaces the respective contact region 29 of the terminal contact 28 in the direction of the housing interior. The spring is compressed. If the measuring tube 1 is in the installed state, the spring drives the contact region into the original position, wherein said contact region is guided into the holder 16 of the second measuring electrode part 10.2 and forms a positive-locking or at least a mechanical and electrical contact therewith. The contact regions 29 of the terminal contacts 28 are of pin-shaped design and rounded.

The measuring electrode body 9 of the measuring electrodes 3.1, 3.2 is formed from a material which comprises metal. In the medium-contacting front region of the measuring electrodes 3.1, 3.2, the respective measuring electrode 3.1, 3.2 assumes the shape of a tip electrode.

Figures 4A, 4B:
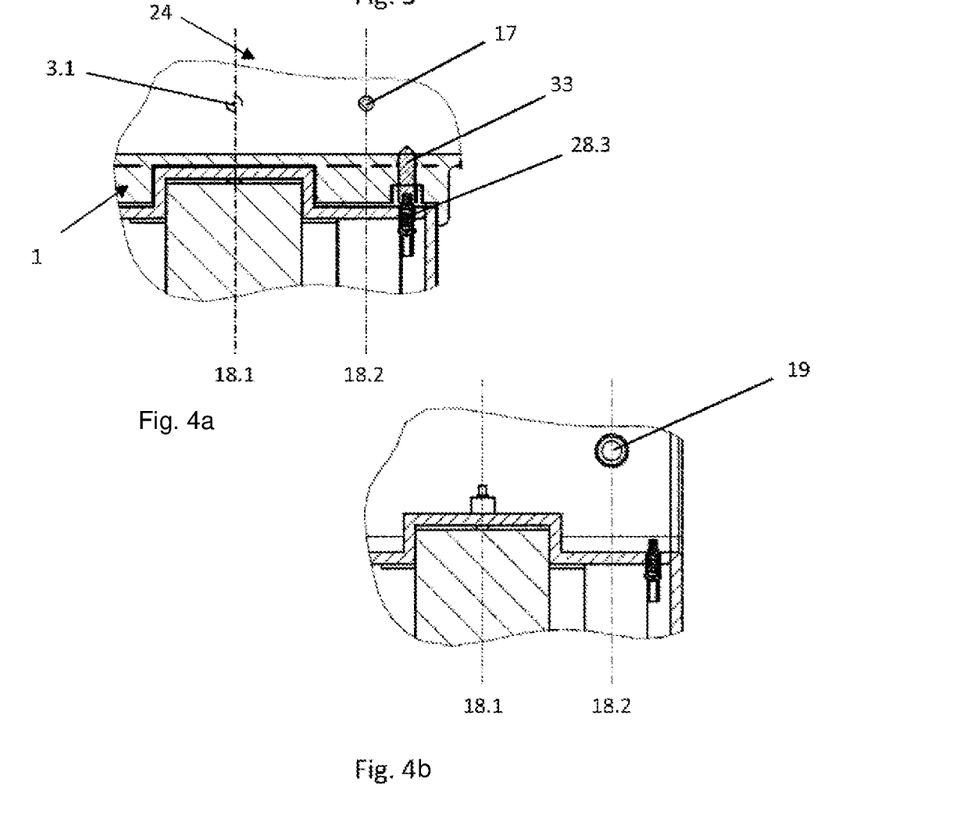
FIG. 4a shows a detail view of a cross-section of the receiving unit from FIG. 1 detailing the measuring tube holder with an inserted measuring tube.
FIG. 4b shows a detail view of the cross-section of the receiving unit from FIG. 1, detailing the measuring tube holder without an inserted measuring tube.

FIG. 4 shows a close-up view from a cross section of the receiving unit, especially of the measuring tube holder 24 with an inserted measuring tube 1, and a close-up view from a cross section of the receiving unit, especially of the measuring tube holder 24 without an inserted measuring tube 1. The depicted measuring tube 1 comprises a measuring electrode 3.1 which at least partially projects into the channel which is suitable for conducting the medium. A temperature sensor 17 is arranged offset in the longitudinal direction of the measuring tube 1. The temperature sensor 17 is suitable for determining a measured variable proportional to the medium temperature. A measuring circuit arranged in the housing is configured to communicate with the temperature sensor 17. The temperature sensor 17 is contacted by a plug connector 19 arranged in the base surface of the measuring tube holder 24. By inserting the measuring tube in a mounting direction, the connection body of the temperature sensor 17, which is complementary to the plug connector 19, is inserted onto the plug connector 19 or into the plug connector 19. A reference electrode 33, which serves for grounding the medium, is arranged in the lower part of the measuring tube 1, i.e., below the longitudinal plane of the measuring tube.

The reference electrode 33 is designed as a tip electrode and is connected to the measuring circuit via a third terminal contact 28.3. In the installed state, the contact region 29.3 of the third terminal contact 28.3 extends in a holder of the reference electrode 33. The third terminal contact 28.3 likewise has a resilient design. The first measuring electrode 3.1 or the first terminal contact 28.1 is located in a first cross-sectional plane 18.1, while the reference electrode 33 is located in a second cross-sectional plane 18.2 which is arranged offset in the longitudinal direction of the measuring tube 1.

Figure 5A:
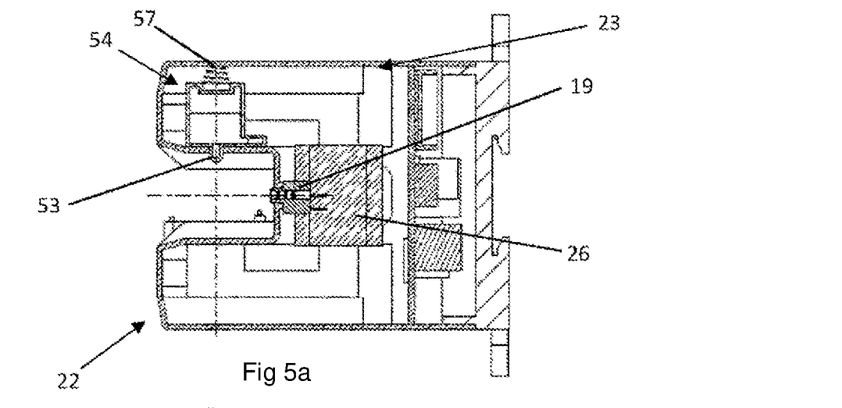
FIG. 5a shows a longitudinal section through the embodiment of the receiving unit depicted in FIG. 1 through the fixing device.
Figure 5B:
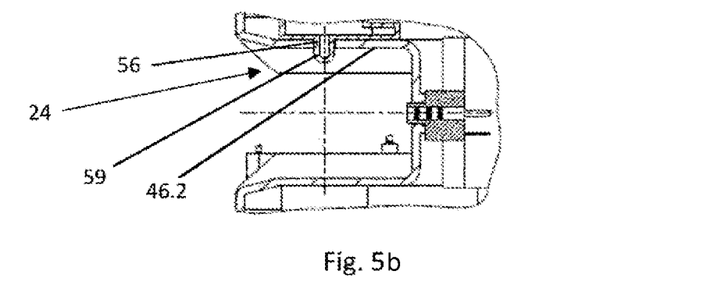
FIG. 5b shows a detail view of the longitudinal section of FIG. 5a of the measuring tube holder.

FIG. 5 shows a longitudinal section through the embodiment of the receiving unit 22 depicted in FIG. 1, especially through the fixing device 54, and a close-up view of the measuring tube holder 24. The depicted fixing device 54 comprises a fixing body 53 and a spring which is arranged on an inner surface 57 of the housing 23. In the original state, a partial section of the fixing body 53 rests against an inner side of the housing wall, especially on a partial section of the wall on which the leg surface 46.2 is located. Located in the leg surface 46.2 is an opening 56 through which the fixing body 53 extends. The fixing body 53 projects into the measuring tube holder 24. The fixing body 53 comprises a pressing surface 59, which has a normal vector formed from a sum of two base vectors, namely from a first base vector which points exclusively counter to the mounting direction, and a second base vector which points into the measuring tube holder 24 and runs perpendicular to the first base vector.

A plug connector 19 is arranged in the base surface 47 of the measuring tube holder 24, which plug connector is designed as a sleeve, especially as a jack sleeve. The plug connector has a longitudinal axis which runs parallel to a measuring electrode axis of the measuring tube. The plug connector 19 is arranged offset in the longitudinal direction of the measuring tube (not shown) with respect to the coil 26.

Figure 6:
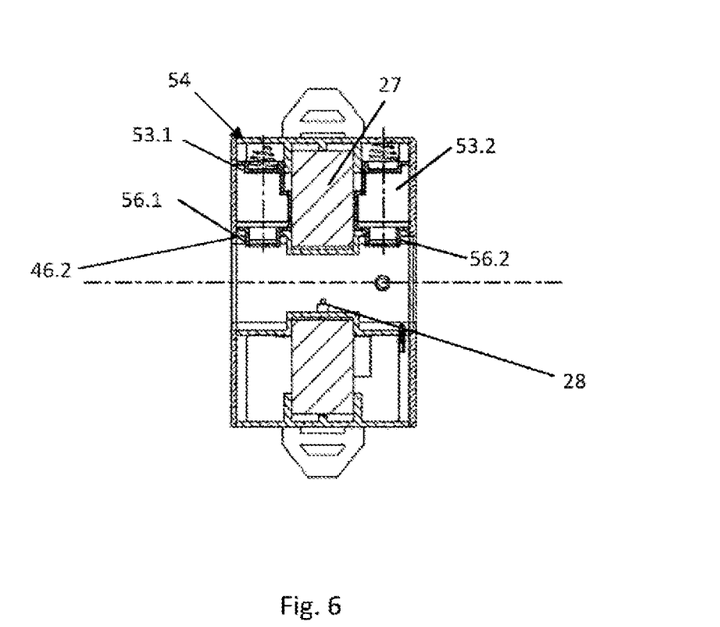
FIG. 6 shows a cross-section through the embodiment of the receiving unit depicted in FIG. 1 through the fixing device.

FIG. 6 shows a cross section through the embodiment of the receiving unit 22 depicted in FIG. 1, especially through the fixing device 54. The depicted fixing device 54 comprises two fixing bodies 53.1 53.2 which are arranged in the housing 23, each having a resilient design. The fixing bodies 53.1, 53.2 are arranged offset in the longitudinal direction of the measuring tube holder 24. The coil core 27 of the magnetic-field-generating device extends between the fixing bodies 53.1, 53.2. The fixing device 54 is arranged exclusively on one side of the measuring tube holder 24. The terminal contacts 28 for the measuring electrodes and the reference electrode are mounted on the opposite side. Two openings 56.1, 56.2 through which each of the fixing bodies 53.1, 53.2 extends are located in the leg surface 46.2.

The fixing body 53 has a pressing surface 59, which ensures that a straight insertion of the measuring tube 1 into the measuring tube holder 24 when there is contact between the pressing surface 59 of the fixing body 53 and the pressing surface 55 of the measuring tube 1 is converted into a movement of the fixing body 53 perpendicular to the mounting direction in the direction of the housing interior. The pressing surface 59 therefore has a normal vector formed from a sum of two base vectors, namely from a first base vector, which points exclusively counter to the mounting direction, and a second base vector which points into the measuring tube holder 24 and runs perpendicular to the first base vector.

Figure 7:
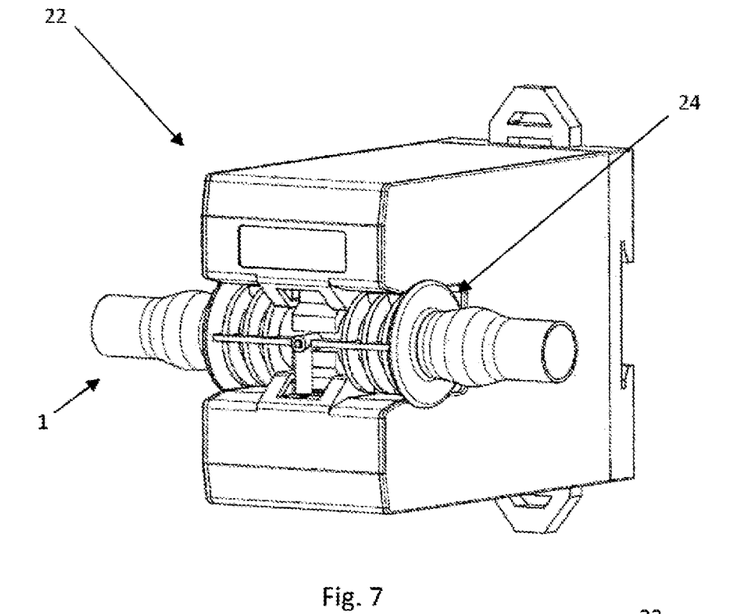
FIG. 7 shows a perspective view of a further embodiment of the receiving unit with an inserted measuring tube according to the present disclosure.

FIG. 7 shows a perspective view of a further embodiment of the receiving unit 22 with an inserted measuring tube 1. The embodiment depicted in FIG. 7 differs from the previously depicted embodiment (see FIGS. 1 to 6) mainly in the embodiment of the measuring tube 1, the magnetic-field-generating device arranged in the housing, and the measuring tube holder 24.

Figure 8A:
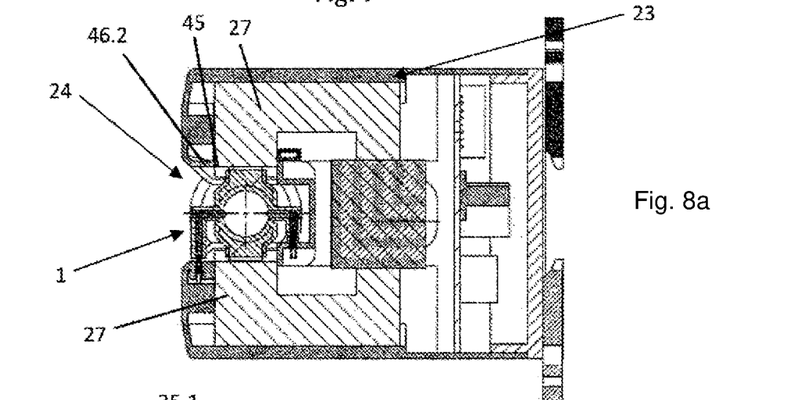
FIG. 8a shows a longitudinal section through the embodiment of the receiving unit depicted in FIG. 7.
Figure 8B:
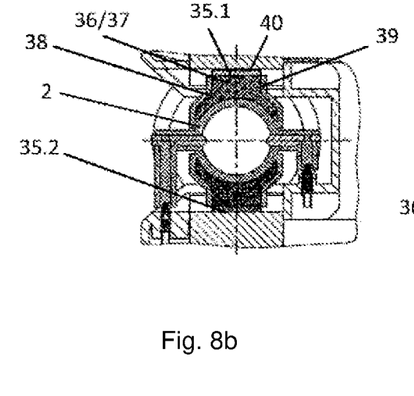
FIG. 8b shows a detail view of the measuring tube holder depicted in FIG. 7.
Figure 8C:
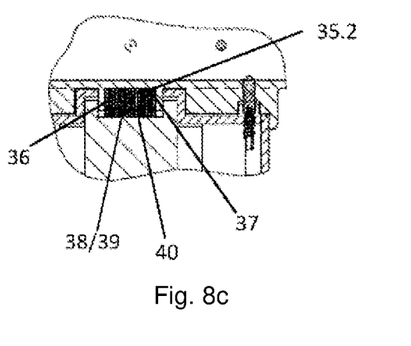
FIG. 8c shows a detail view of a cross-section of the measuring tube holder with an inserted measuring tube.

FIG. 8 shows a longitudinal section through the receiving unit 22 depicted in the embodiment of FIG. 7, a close-up view of the measuring tube holder 24 and a close-up view of a cross section of the measuring tube holder 24, each with an inserted measuring tube 1. The depicted magnetic-field-generating device 25 substantially corresponds to the magnetic-field-generating device 25 from FIG. 2. The main difference is that two partial section of the coil core 27 each extend through an opening 45. The coil core 27 is formed in one piece or in multiple parts from a solid magnetic core, or from at least one individual sheet metal part, or from a plurality of sheet metal parts stacked especially in the longitudinal direction of the pole shoe and connected to one another. The same applies to the pole shoe 35. Different than usual, the pole shoe 35 is arranged not in the housing 23 but on the measuring tube body 2. The pole shoe 35 has a base surface 40 which in the installed state is in contact with the coil core 27. The magnetic field thus generated by the coil is guided through the coil core to the pole shoe 35 arranged on the measuring tube 1, which pole shoe at least partially spans the channel of the measuring tube, thereby forming a substantially homogeneous magnetic field inside the channel.

In the depicted embodiment, the measuring tube 1 comprises two diametrically arranged pole shoes 35.1, 35.2. By means of an injection molding method, the pole shoes 35.1, 35.2 are partially overmolded by the potting compound that forms the measuring tube body 2, but at least to the extent that the side faces 38, 39 and the end faces 36, 37 are at least partially covered and the base surface 40 is free or partially exposed, so that no disadvantageous intermediate layer is present between the base surface 40 of the pole shoe 35 and the coil core 27. The base surface 40 is designed to be complementary to the respective end section of the coil core 27. In the depicted embodiment, the base surface 40 and the associated end section of the coil core 27 are designed as a planar surface.

The embodiment of the terminal contacts corresponds to the depicted embodiment of FIG. 3.

Figure 9:
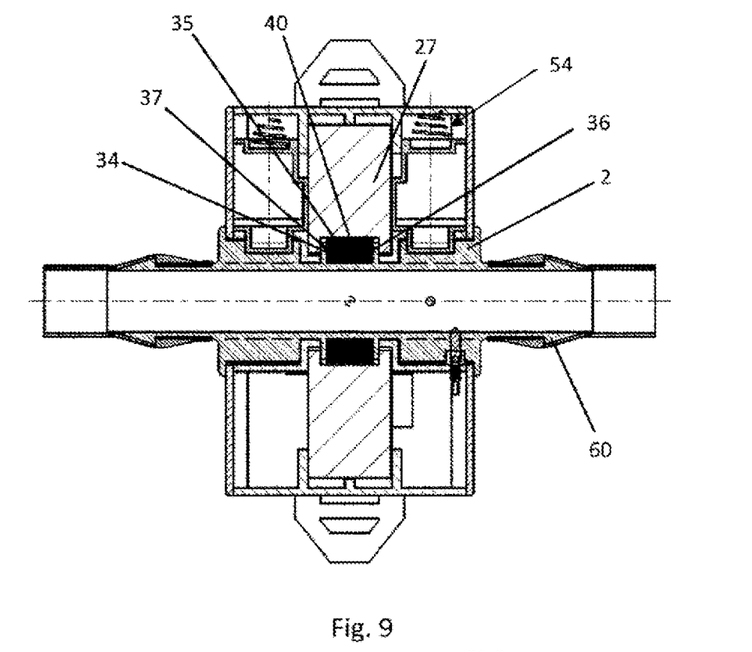
FIG. 9 shows a cross-section through the embodiment of the receiving unit depicted in FIG. 7 with an inserted measuring tube.

FIG. 9 shows a cross section through the embodiment of the receiving unit 22 depicted in FIG. 7 with an inserted measuring tube 1, wherein the measuring tube 1 is inserted in a positive-locking and friction-locking manner in the measuring tube holder 24. In contrast to the embodiment depicted in FIG. 6, the measuring tube 1 has a holder 34 into which exactly one pole shoe 35 is inserted. The holder 34 is designed such that the pole shoe 35 is connected to the measuring tube body 2 in a positive-locking manner. The end faces 36, 37 touch the measuring tube body 2 as well as the side faces 38, 39. A subsequent removal of the pole shoe 35 from the holder 34 is not possible because the pole shoe 35 is overmolded with the potting material forming the measuring tube body 2, or because the pole shoe 35 is integrated in the measuring tube body 2. The base surface 40 of the pole shoe 35 contacts the coil core 27, which extends through an opening in the end face of the measuring tube holder. The arrangements and embodiments of the terminal contacts 28 and the fixing device 54 correspond to the previous, depicted embodiments. The measuring tube 1 is connected to a hose system via the process connections 60.

Figure 10:
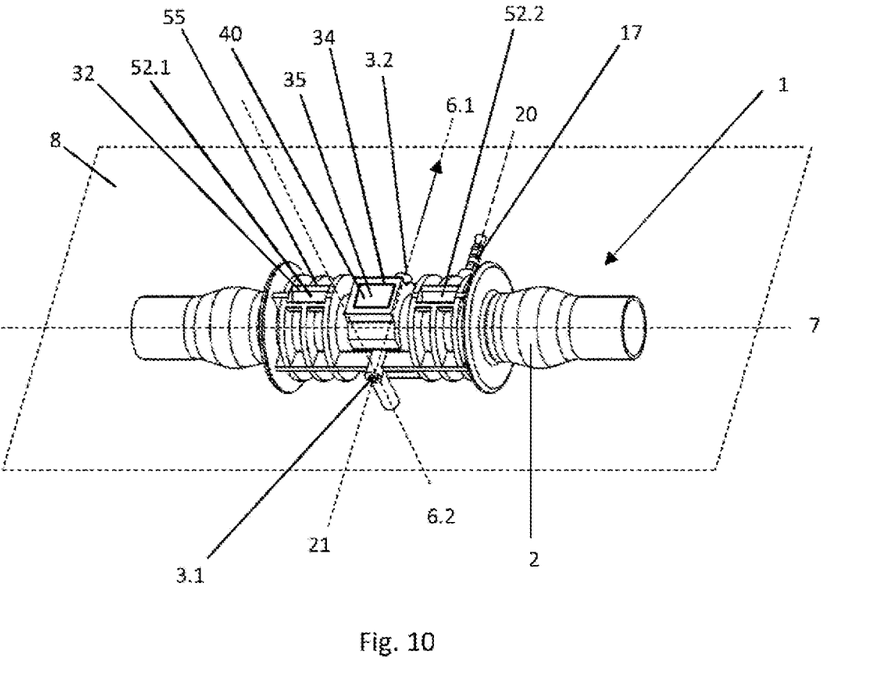
FIG. 10 shows a perspective view of an embodiment of the measuring tube.

FIG. 10 shows a perspective view of an embodiment of the measuring tube 1. The measuring tube 1 has two diametrically arranged measuring electrodes 3.1, 3.2, each of which is formed in two parts. A first measuring electrode part has a first longitudinal axis 6.1 which runs perpendicular to the longitudinal axis 7 of the measuring tube 1 and corresponds to the electrode axis 21. The second measuring electrode part has a second longitudinal axis 6.2 which runs perpendicular to the first longitudinal axis. In addition, the measuring tube 1 has a temperature sensor 17 with a plug connector which is complementary to a plug connector arranged in the receiving unit, especially in the measuring tube holder. The depicted plug connector of the temperature sensor 17 is a jack plug. The electrode axis 21, the reference axis 20 of the temperature sensor 17, and the longitudinal axis of the measuring tube body 7 lie within a common longitudinal plane 8.

The measuring tube body 2 has two diametrically arranged holders 34 each for a pole shoe 35, wherein a reference line connecting the pole shoes 35 intersects the longitudinal axis 7 of the measuring tube 1 perpendicularly. The pole shoes 35 are integrated in the measuring tube body 2 in such a way that only a base surface 40 is exposed which is brought into contact with the respective coil core arranged in the receiving unit. The base surface 40 is planar in the depicted embodiment.

In addition, the measuring tube 1 has two holders 52.1, 52.2 which are offset in the longitudinal direction of the measuring tube 1 and are configured to exclude a fixing body of a fixing device arranged in the receiving unit. Starting from the holders 52.1, 52.2, a pressing surface 55 extends in each case in the mounting direction. The pressing surface 55 has a normal vector which is formed from the sum of two base vectors, namely a first base vector which points in the mounting direction (see arrow), and a second base vector which is oriented perpendicular to the first base vector and parallel to the second longitudinal axis 6.2. The pressing surface 55 serves to convert a linear mounting movement of the measuring tube 1 in the mounting direction into a linear movement of the fixing body in the direction of the housing interior. The fixing body is displaced uniformly into the housing interior by the pressing surface 55. After the pressing surface has been overcome, the spring of the fixing device causes the fixing body to be moved in the direction of the holder 52. The holder 52 is formed complementary to a partial section of the fixing body. In the depicted embodiment, a guide surface 32 is provided between the holder 52 and the pressing surface 55, which guide surface is formed inclined to the pressing surface 55 and is shaped in such a way that, in the case of a tensile force on the measuring tube opposite the mounting direction, the fixing body is guided out of the holder 52, and thus the positive-locking and/or friction-locking connection between the measuring tube 1 and the receiving unit is released. According to the embodiment, an additional unlocking device is not necessary. A longitudinal plane of the measuring tube body, which is oriented perpendicular to the electrode axis 21, divides the holders 52.1, 52.2 in two sides in each case. The longitudinal plane is not a mirror plane, because only one of the two sides has a guide surface 32. The opposite side has a stop surface, the normal vector of which points substantially just in the mounting direction.

The measuring tube body 2 is formed in one piece and produced by means of an injection molding method.

Figure 11A:
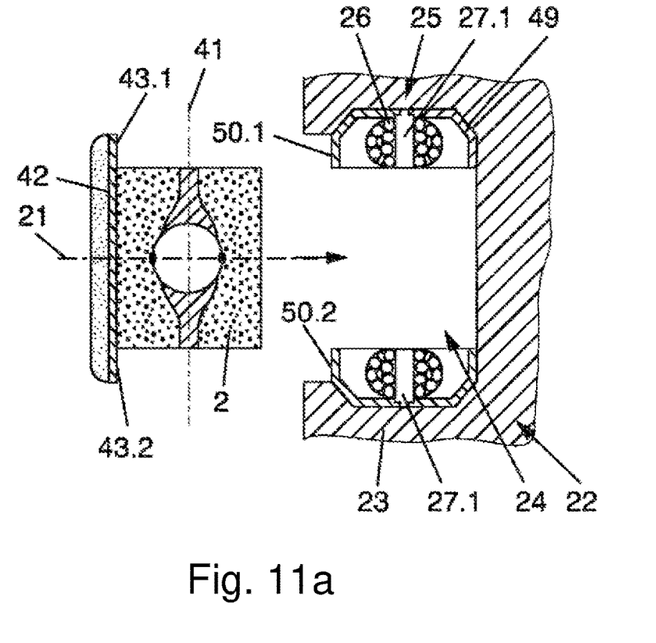
FIG. 11a shows an exploded longitudinal section through a further embodiment of the receiving unit and the measuring tube according to the present disclosure.
Figure 11B:
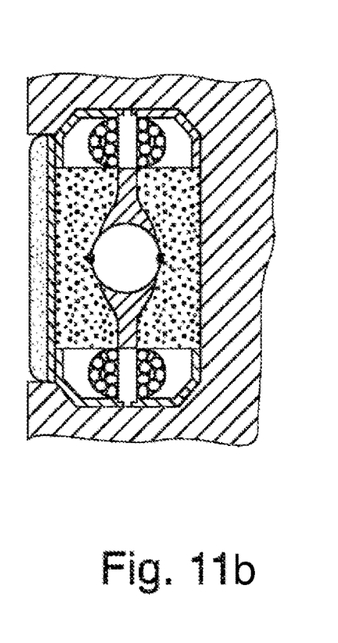
FIG. 11b shows the receiving unit and the measuring tube of FIG. 11a in an assembled state.

FIG. 11 shows a cross section through a further embodiment of the measuring tube 1 and the receiving unit 22 in the assembled state (left) and in the installed state (right). For reasons of clarity, the terminal contacts were not shown. Arranged in the housing 23 of the receiving unit 22 is a magnetic-field-generating device 25 which comprises two coils 26 arranged diametrically on the measuring tube holder 24, each comprising a coil core 27.1, 27.2. The ends of the coil cores 27.1, 27.2 facing away from the measuring tube holder 24 are connected to one another via exactly one field guide body 49. In addition, the magnetic-field-generating device 25 has two contact surfaces 50.1, 50.2 which extend from the end face 51 of the housing 23 and can be contacted by field-guiding components of the measuring tube 1.

The measuring tube 1 has two diametrically arranged measuring electrodes which are intersected by an electrode axis 21. In addition, two diametrically arranged pole shoes are integrated in the measuring tube body 2. A longitudinal plane 41 runs perpendicular to the electrode axis 21, wherein the longitudinal axis of the measuring tube lies in the longitudinal plane 41. The longitudinal plane 41 divides the measuring tube 1 into two parts I, II. A part I of the measuring tube 1 has a field guide body 42 which is at least partially integrated in the measuring tube body 2 and has a first contact surface 43.1 and a second contact surface 43.2, each of which is designed to be exposed and serves to form a contact with the contact surfaces 50.1, 50.2 of the magnetic-field-generating device 25 when the measuring tube 1 is inserted into the measuring tube holder 24. The field guide body 42 can be overmolded in the injection molding method, whereby the field guide body 42 is connected to the measuring tube body 2 in a positive-locking manner.

In the installed state, the field guide body 42 touches the contact surfaces 50.1, 50.2 of the magnetic-field-generating device 25, and the generated magnetic field is guided around the measuring section of the measuring tube through the two field guide bodies 42, 49 from a coil core 27.1 up to the opposite coil core 27.2.

The invention claimed is:

1. A measuring tube for conducting a flowable medium in a longitudinal direction, the measuring tube comprising:
   a measuring tube body, which is electrically insulating, including a mounting surface configured to enable a mechanically reversible installation of the measuring tube in a receiving unit in a position defined by the mounting surface, wherein the measuring tube body includes an integrally formed holder, wherein the measuring tube body is monolithic and fabricated by a primary shaping operation;
   at least two measuring electrodes arranged diametrically in the measuring tube body as to enable galvanic contact with the medium; and
   at least one pole shoe adapted from a single sheet metal part or from a plurality of sheet metal parts stacked in a longitudinal direction of the pole shoe and connected to one another,
   wherein the at least one pole shoe is disposed in the holder of the measuring tube body and is partially overmolded by a material of the measuring tube body in the primary shaping operation.

2. The measuring tube of claim 1,
   wherein the at least one pole shoe includes a first end face and a second end face, which delimit the pole shoe in the longitudinal direction, and
   wherein the measuring tube body extends along the first end face and the second end face, covering each completely in the longitudinal direction.

3. The measuring tube of claim 2, wherein:
   the at least one pole shoe includes a first side face and a second side face;
   the first side face connects the first end face to the second end face;
   the second side face connects the first end face to the second end face; and
   the measuring tube body extends along the first side face and the second side face, covering each completely.

4. The measuring tube of claim 3, wherein:
   the at least one pole shoe includes a base surface that is not covered, or is only partially covered, by the measuring tube body;

the base surface connects the first end face and the second end face; and the base surface connects the first side face with the second side face.

5. The measuring tube of claim 1, wherein the primary shaping operation is an injection molding operation.

6. The measuring tube of claim 1, wherein:

a longitudinal plane, in which extends a longitudinal axis of the measuring tube and which extends perpendicular to an electrode axis connecting two measuring electrodes, divides the measuring tube body into two sides;

the measuring tube comprises exactly one field guide body configured to guide a magnetic field, wherein the field guide body is disposed on one of the two sides of the measuring tube body;

the field guide body is connected in a positive locking manner to the measuring tube body;

the field guide body includes at least one open contact surfaces; and the field guide body is configured to connect two coil cores of a magnetic-field-generating device to each other after installation of the measuring tube in the receiving unit.

7. A magnetic-inductive flow meter, comprising:

a measuring tube according to claim 1 configured to conduct a flowable medium in a flow direction; and the receiving unit, comprising:

a housing including a measuring tube holder;

a magnetic-field-generating device adapted to generate a magnetic field that extends through the measuring tube, the magnetic-field-generating device comprising a coil and a coil core, wherein the magnetic-field-generating device is disposed in the housing;

a measuring circuit configured to determine a measuring voltage applied across the at least two measuring electrodes of the measuring tube;

an operating circuit configured to operate the magnetic-field-generating device; and at least two terminal contacts configured to be detachably connected to the at least two measuring electrodes of the measuring tube electrically and mechanically to the measuring circuit, wherein contact regions of the respective terminal contacts protrude from the housing and extend into the measuring tube holder, wherein the measuring tube is connected in a mechanically reversible manner to the receiving unit.

8. The magnetic-inductive flow meter of claim 7, wherein the measuring tube is connected to the receiving unit by friction locking and/or positive locking.

9. The magnetic-inductive flow meter of claim 7, wherein the at least one pole shoe on the measuring tube and the coil core, which extends through an opening in the measuring tube holder, contact each other.

10. The magnetic-inductive flow meter of claim 7, wherein:

the magnetic-field-generating device disposed in a housing of the receiving unit includes two coils;

the two coils each include at least one coil core which extends through the corresponding coil; and a field guide body of the measuring tube connects the two coil cores to each other.

* * * * *